(12) United States Patent
Lebas et al.

(10) Patent No.: US 10,570,986 B2
(45) Date of Patent: Feb. 25, 2020

(54) VIBRATION DAMPING DEVICE

(71) Applicant: VALEO EMBRAYAGES, Amiens (FR)

(72) Inventors: Gilles Lebas, Villers Bretonneux (FR); Emmanuel Commeine, Courcelles sous Moyencourt (FR); Roel Verhoog, Gournay sur Aronde (FR); Ivan Dutier, Rainneville (FR); Thibault LaForge, Pernois (FR); Michael Hennebelle, Houdain (FR)

(73) Assignee: Valeo Embrayages, Amiens (FR)

(*) Notice: Subject to any disclaimer, the term of this patent is extended or adjusted under 35 U.S.C. 154(b) by 518 days.

(21) Appl. No.: 15/213,997

(22) Filed: Jul. 19, 2016

(65) Prior Publication Data

US 2017/0023070 A1    Jan. 26, 2017

(30) Foreign Application Priority Data

Jul. 24, 2015   (FR) .................................... 15 57106

(51) Int. Cl.
   *F16F 15/123*    (2006.01)
   *F16F 15/134*    (2006.01)
   *F16H 45/02*     (2006.01)

(52) U.S. Cl.
   CPC .. *F16F 15/12353* (2013.01); *F16F 15/13469* (2013.01); *F16H 2045/0263* (2013.01)

(58) Field of Classification Search
   CPC ................ F16F 15/1217; F16F 15/123; F16F 15/12353; F16F 15/12373; F16F 15/134;
   (Continued)

(56) References Cited

U.S. PATENT DOCUMENTS 2,613,515 A * 10/1952 Crutchley ............. F16F 15/123
                                                      192/214
3,983,982 A * 10/1976 Worner ................. F16F 15/129
                                                    192/213.31
(Continued)

FOREIGN PATENT DOCUMENTS

DE          19954676 A1    5/2000
DE       102013213422 A1    2/2014
(Continued)

OTHER PUBLICATIONS

Specification Translation of DE 19954676. Jaeckel, et al. May 18, 2000. Divided flywheel for vehicle, with primary and secondary mass parts, in which annular component runs radially outward along flange part. (Year: 2000).*

*Primary Examiner* — Josh Skroupa
(74) *Attorney, Agent, or Firm* — Berenato & White, LLC

(57) ABSTRACT

A vibration damping device for a motor vehicle, features a first movable element (13, 14) and a second movable element (15, 16) both rotatable around an axis X, at least one group of elastic members (25, 26) mounted between the first movable element and the second movable element and acting against rotation of the first movable element and second element with respect to one another, and a phasing member (32, 33) rotationally movable around the axis X. The first movable element (13, 14) and the second movable element (15, 16) are coaxial and capable of transmitting a torque. The phasing member (32, 33) includes a first portion (32) and a second portion (33), for arranging the elastic members of the at least one group in series so that the elastic members of each group deform in phase with one another.

11 Claims, 12 Drawing Sheets

(58) Field of Classification Search
CPC .............. F16F 15/1343; F16F 15/13469; F16F 15/13492; F16F 15/1421; F16H 2045/0226; F16H 2045/0263
USPC .......................... 464/68.1, 68.2, 68.4, 68.41
See application file for complete search history.

(56) References Cited

U.S. PATENT DOCUMENTS

| | | | | |
|---|---|---|---|---|
| 4,410,075 A * | 10/1983 | Caray | .............. | F16F 15/12373 192/213.3 |
| 4,470,494 A * | 9/1984 | Takeuchi | ............ | F16F 15/1215 192/213.31 |
| 4,485,907 A * | 12/1984 | Nishimura | ............ | F16F 15/129 192/213.3 |
| 4,493,408 A * | 1/1985 | Nagano | ................. | F16F 15/129 192/213.3 |
| 4,577,742 A * | 3/1986 | Saida | ................ | F16F 15/12346 192/213.22 |
| 4,596,535 A * | 6/1986 | Ooga | .................... | F16F 15/129 192/213.22 |
| 4,643,289 A * | 2/1987 | Yoneda | ................ | F16D 13/644 192/113.34 |
| 4,645,053 A * | 2/1987 | Kitayama | ............. | F16F 15/129 192/213.31 |
| 4,650,053 A * | 3/1987 | Kayanoki | ............... | F16F 15/12 192/213.21 |
| 4,674,992 A * | 6/1987 | Carmillet | .............. | F16F 15/129 192/213.31 |
| 5,004,088 A * | 4/1991 | Bolton | .............. | F16F 15/12313 192/53.4 |
| 5,145,463 A * | 9/1992 | Bacher | ................ | F16F 15/1217 192/211 |
| 5,450,935 A * | 9/1995 | Rumignani | ........... | F16F 15/129 192/213.22 |
| 5,609,526 A * | 3/1997 | Kitayama | ............. | F16F 15/1238 464/64.1 |
| 5,725,080 A * | 3/1998 | Lohaus | ................. | F16F 15/123 192/213.22 |
| 5,769,199 A * | 6/1998 | Lohaus | ................. | F16F 15/123 192/213.21 |
| 5,800,270 A * | 9/1998 | Uenohara | ........... | F16F 15/1232 192/205 |
| 5,820,466 A * | 10/1998 | Graton | .................. | F16F 15/129 464/68.41 |
| 5,857,552 A * | 1/1999 | Hashimoto | ........ | F16F 15/12313 192/212 |
| 6,241,614 B1 * | 6/2001 | Mizukami | .............. | F16F 15/129 192/213.21 |
| 6,681,911 B2 * | 1/2004 | Kroll | ................... | F16F 15/1397 192/201 |
| 7,559,844 B2 * | 7/2009 | Saeki | ..................... | F16F 15/129 464/68.4 |
| 8,047,922 B2 | 11/2011 | Maienschein | | |
| 8,434,602 B2 * | 5/2013 | Kombowski | ........... | F16H 45/02 192/200 |
| 8,795,092 B2 * | 8/2014 | Verhoog | ........... | F16F 15/12366 464/68.4 |
| 9,068,624 B2 * | 6/2015 | Verhoog | .................. | F16F 15/12 |
| 9,127,721 B2 * | 9/2015 | Verhoog | ............. | F16F 15/1217 |
| 9,470,290 B2 | 10/2016 | Hoffmann | | |
| 9,638,283 B2 * | 5/2017 | Wirachowski | ........ | F16F 15/145 |
| 9,709,144 B2 * | 7/2017 | Mencher | ............ | F16F 15/13484 |
| 9,739,340 B2 * | 8/2017 | Nakagaito | ........... | F16F 15/1395 |
| 9,797,471 B2 * | 10/2017 | Kram | ..................... | F16F 15/145 |
| 9,803,717 B2 * | 10/2017 | Schnaedelbach | ..... | F16F 15/145 |
| 10,100,898 B2 * | 10/2018 | Kram | ..................... | F16F 15/145 |
| 2011/0287844 A1 | 11/2011 | Steinberger | | |
| 2016/0356340 A1 * | 12/2016 | Ito | ......................... | F16F 15/134 |
| 2017/0227087 A1 * | 8/2017 | Dogel | ............... | F16F 15/13157 |
| 2017/0350470 A1 * | 12/2017 | Wada | ..................... | F16F 15/134 |

FOREIGN PATENT DOCUMENTS

| | | | | |
|---|---|---|---|---|
| EP | 1975458 A2 * | 10/2008 | ............ | F16F 15/123 |
| FR | 2119133 A5 * | 8/1972 | ............ | F16F 15/123 |
| FR | 2613446 A1 * | 10/1988 | .......... | F16F 15/1202 |
| FR | 2629165 A2 * | 9/1989 | .......... | F16F 15/1202 |
| FR | 3011603 A1 | 4/2015 | | |
| WO | WO2014009122 A1 | 1/2014 | | |

* cited by examiner

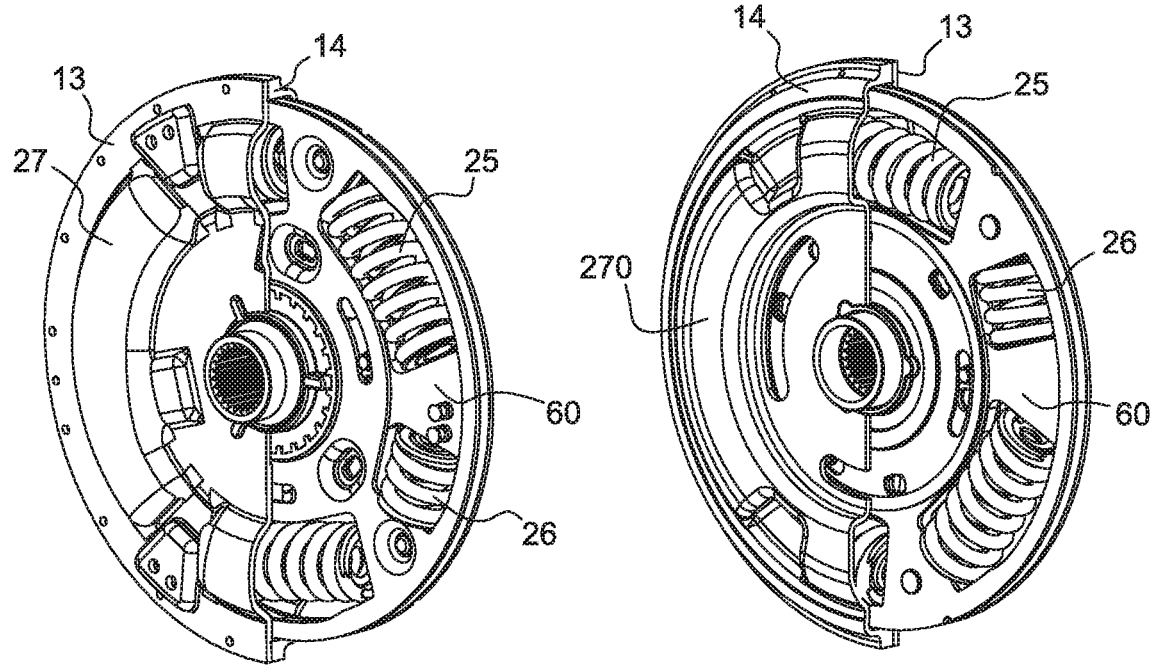
Fig. 3a  Fig. 3b
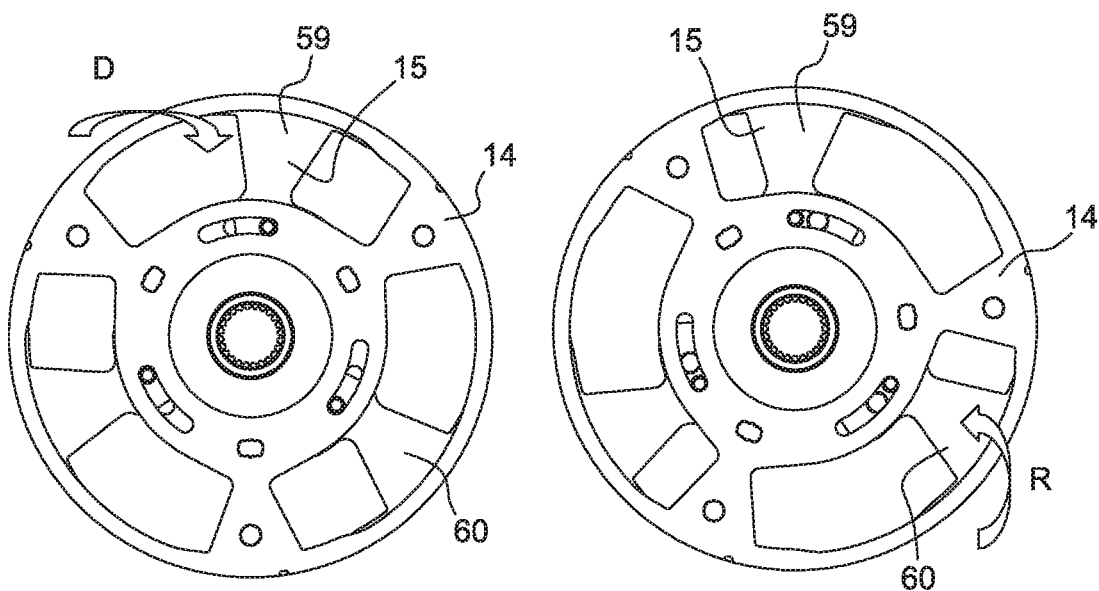
Fig. 4a  Fig. 4b

VIBRATION DAMPING DEVICE

CROSS-REFERENCE TO RELATED APPLICATIONS AND CLAIM TO PRIORITY

This application is related to Patent Application No. 1557106 filed Jul. 24, 2015 in France, the disclosure of which is incorporated herein by reference and to which priority is claimed.

FIELD OF THE INVENTION

The present invention relates to a torsional damping device, in particular for a motor vehicle transmission system.

BACKGROUND OF THE INVENTION

In such an application the torsional damping device can be integrated into a transmission assemblage comprising a friction clutch capable of selectively connecting the combustion engine to the gearbox, in order to filter vibrations due to irregularities of the engine.

As a variant, in such an application the torsional damping device can be integrated into a dual mass flywheel, into a friction disk of the clutch, or into a hydrodynamic torque converter.

The invention also relates to a transmission assemblage for a motor vehicle of the hybrid type, in which an electric machine is disposed in the transmission system between the engine and the gearbox.

A device of this kind has, in general, a torque input element, a torque output element, and elastic members mounted between the torque input element and torque output element and acting against rotation of the torque input element and torque output element with respect to one another.

When the torque transmission device is of the "long travel damper" (LTD) type, it comprises several groups of elastic members, the elastic members of a given group being arranged in series by means of a phasing member so that the elastic members of each group deform in phase with one another.

The document U.S. Pat. No. 8,047,922 discloses a torsional damper having torque input elements and torque output elements between which are arranged several groups of elastic members arranged in series by means of a phasing member. The phase washer is arranged radially outside the web while being able to arrange the springs in series by means of a stop that becomes received between two springs mounted one after another.

A damper of this kind has a relatively complex structure.

SUMMARY OF THE INVENTION

An object of the invention is in particular to provide a simple, effective, and economical solution to this problem.

To that end, it proposes a vibration damping device for a motor vehicle, having:
  a first element and a second element that are rotationally movable around an axis X, coaxial, and capable of transmitting a torque;
  at least one group of elastic members mounted between the first element and the second element and acting against rotation of the first element and second element with respect to one another;
  a phasing member, rotationally movable around the axis X and constituted by a first portion and a second portion, for arranging the elastic members of that group in series so that the elastic members of each group deform in phase with one another.

In an embodiment of the invention, the device has a pendulum damper comprising a pendulum support member capable of moving rotationally around the rotation axis on which at least one flyweight is movably mounted, the pendulum support member being rotationally connected to the phasing member.

In an embodiment of the invention, the first movable element is constituted by a first portion of the first movable element and by a second portion of the first movable element, the first portion of the first movable element and the second portion of the first movable element being connected to one another so as to delimit a space inside which the second movable element and the phasing member are received.

In an embodiment of the invention, the space delimited by the first portion of the first movable element and by the second portion of the first movable element is sealed.

In an embodiment of the invention, the phasing member has a first portion of the phasing member and a second portion of the phasing member, the first portion of the phasing member and the second portion of the phasing member being disposed on either side of the second movable element.

The first portion and the second portion of the phasing member are coaxial.

The second element can constitute a web on either side of which are placed the first portion of the phasing member and the second portion of the phasing member. The two portions of the phasing member are integral.

In an embodiment of the invention, they do not go beyond one another on their radially outer contour. They also do not go beyond the outer radial periphery of the web. The damping device according to the invention is thus, advantageously, radially compact.

In an embodiment of the invention, the first portion of the phasing member, the second portion of the phasing member, and the support member are connected together by a single connecting member.

The first portion of the phasing member and the second portion of the phasing member are also connected to one another by fastening means. The fastening means can be, in an example, rivets. The first portion of the phasing member has, at the connecting location with the second portion of the phasing member, a local deformation or indentation. This local deformation allows the first portion of the phasing member to become locally closer to, or in fact to come into contact with, the second portion of the phasing member. This proximity of the two portions to one another allows at least a local increase in the rigidity of the phasing member. The indentation is implemented preferably at a location close to the radially outer periphery of the first portion of the phasing member.

In an embodiment of the invention, the space is rendered sealed on the one hand by means of a first sealing means disposed between the first portion of the first movable element and the first portion of the phasing member, and on the other hand by means of a second sealing means disposed between the second portion of the phasing member and the second portion of the first movable element.

In an embodiment of the invention, the first sealing means and the second sealing means are situated axially on either side of the connecting member.

In an embodiment, the first sealing means is situated radially below the connecting member, and the second sealing means is situated radially above the connecting member.

In an embodiment, the first sealing means and the second sealing means are situated inside the space delimited by the first portion of the first movable element and by the second portion of the first movable element.

In an embodiment of the invention, the space is rendered sealed on the one hand by means of a first sealing means disposed between the first portion of the first movable element and the first portion of the phasing member, and on the other hand by means of a planar-to-planar contact of the second portion of the phasing member against the second portion of the first movable element.

In addition, in an embodiment of the invention, the two guide washers are connected to one another continuously over their entire outer peripheral contour. This continuous connection also contributes to rendering the space sealed.

In an embodiment of the invention, a damping device of this kind can be integrated into a dual mass flywheel, into a friction disk, or into a torque converter.

Also an object of the invention is a torque transmission assemblage comprising:
an inertial wheel intended to be rotationally coupled to a crankshaft and rotationally coupled to a reaction plate, and
a pressure plate,
a friction disk capable of temporarily rotationally coupling the reaction plate to the pressure plate, and
a damping device here-above described coupled to the friction disk.

In an embodiment of the invention, the inertial wheel delimits with the reaction plate a receptacle in which pendulum masses, and at least a portion of a pendulum support of a pendulum damper, are mounted.

Also an object of the invention is a method for assembling a transmission assemblage comprising a damping device as described above, wherein it has the following steps:
installing the front and rear phase washers on the web,
inserting the elastic members into windows of the phase washers and of the web,
fastening the rear guide washer and the front guide washer respectively against the rear phase washer and against the front phase washer.

In an embodiment of the invention, provision is also made to
insert the connecting member through the rear guide washer,
place the pendulum support member of the pendulum damper on the front guide washer,
fasten the connecting member on the pendulum support member.

In an embodiment of the invention, the connecting member is fastened onto the pendulum support member by riveting.

In an embodiment of the invention, provision is made, prior to installation of the support member on the front guide washer, to
fasten the friction disk on the rear guide washer, and
place a reaction plate on a first face of the friction disk situated facing the pendulum damper,
place a pressure plate facing a second face of the friction disk, opposite the first face,
fasten a clutch mechanism to the reaction plate,
fasten an inertial wheel to a crankshaft of an engine,
fasten the clutch mechanism, the reaction plate, the pressure plate, the clutch disk, and the damping device to the inertial wheel.

In an embodiment, the hole of the rear guide washer is filled with a sealing stopper.

To allow passage of the connecting member, provision is made to implement a hole through the rear guide washer. The hole is then filled with the aid of a sealing stopper.

Also an object of the invention is a method for assembling a transmission assemblage comprising a damping device as described above, wherein it has the following steps:
constituting a first subassembly
by installing the front and rear phase washers on the web,
by inserting the elastic members into windows of the phase washers and of the web,
by placing the rear guide washer and the front guide washer respectively against the rear phase washer and against the front phase washer,
constituting a second subassembly by assembling a clutch mechanism,
installing the first subassembly on the second subassembly, between which a reaction plate is inserted.

In an embodiment of the invention, the method provides for:
constituting a third subassembly by assembling a pendulum damper,
inserting a connecting member through a hole constituted through the rear guide washer,
installing the third subassembly onto the first and the second subassembly with the aid of the connecting member.

To allow passage of the connecting member, provision is made to fill the hole with the aid of a sealing stopper.

A final object of the invention is a hybrid module having a combustion engine, a friction clutch equipped with a torsional damping device as described above, and an electric machine and a gearbox.

BRIEF DESCRIPTION OF THE DRAWINGS

The invention will be better understood, and other details, characteristics and advantages of the invention will emerge, upon reading the description below provided as a non-limiting example with reference to the attached drawings, in which:

FIGS. 3a and 3b are three-dimensional depictions of the damping device respectively from a first side of said device and from a second side of said device, according to an embodiment of the invention;

FIGS. 4a and 4b are schematic depictions of the web and of the phasing member at a stop respectively in the forward direction (D) and in the reverse direction (R).

FIGS. 8b and 8c are cross sections of the damping device along an axis A and an axis B of FIG. 8a;

In the description and the claims the terms "outer" and "inner," as well as the orientations "axial" and "radial," will be used to designate elements of a transmission assemblage in accordance with the definitions given in the description. By convention, the "radial" orientation is directed orthogonally to the rotation axis X of the transmission assemblage which determines the "axial" orientation, and from inside to outside moving away from said axis. The terms "outer" and "inner" are used to define the relative position of one element with respect to another with reference to the axis X; an element close to the axis is thus referred to as "inner" as opposed to an "outer" element located radially at the periphery. The terms "rear" (AR) and "front" (AV) are furthermore used to define the relative position of one element with respect to another and with respect to the direction in which the vehicle proceeds when the vehicle is driving forward.

DETAILED DESCRIPTION OF THE PREFERRED EMBODIMENT(S)

Figure 1:
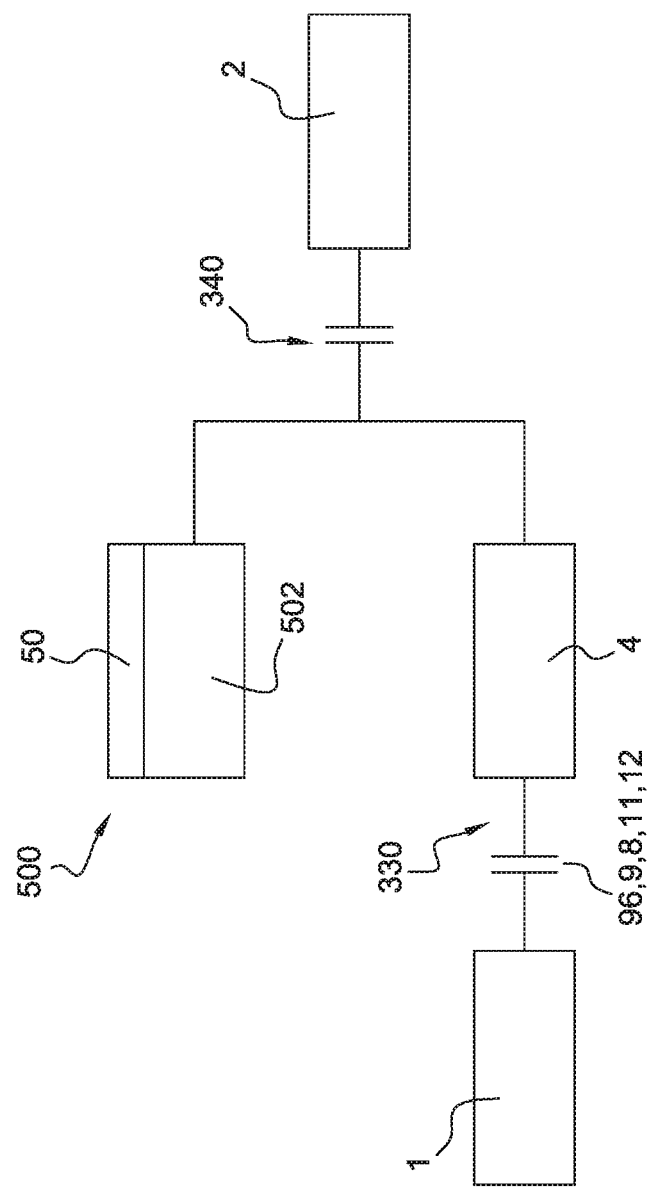
FIG. 1 is a diagram of a transmission assemblage according to a first embodiment of the invention.

FIG. 1 illustrates a transmission assemblage disposed between a combustion engine 1 and a gearbox 2, according to an embodiment of the invention. The transmission assemblage has a first friction clutch 330, a torsional damping device 4, an electric machine 500 comprising a stator 501 and a rotor 502, and a second friction clutch 340.

Figure 2:
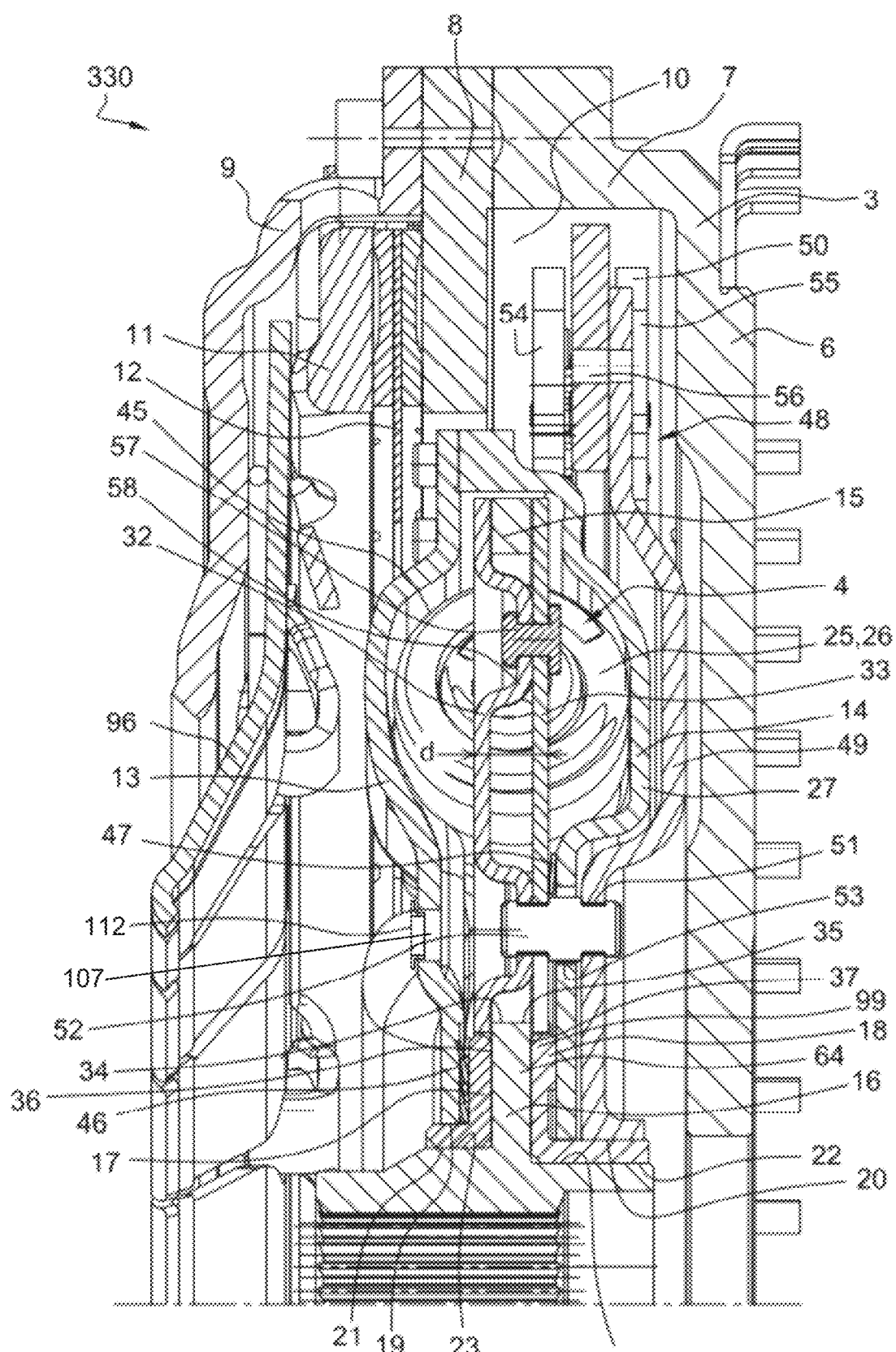
FIG. 2 is an axial half section view of a friction clutch comprising a torsional damping device, according to an embodiment of the invention.

FIG. 2 illustrates first friction clutch 330 associated with torsional damping device 4. First friction clutch 330 is connected to an inertial wheel 3. Inertial wheel 3 has a first annular region 6 extending radially, and a cylindrical region 7 extending axially toward to the rear from the outer periphery of first annular region 6. A second cylindrical region 8 and an annular cover 9 are fastened on cylindrical region 7. First annular region 6, cylindrical region 7, and second annular region 8 define an annular chamber 10.

Inertial wheel 3 also has orifices (not depicted) configured in first annular region 6. Fastening screws (not depicted), engaged into the orifices, allow inertial wheel 3 to be fastened to the end of the crankshaft.

Friction clutch 330 has a reaction plate constituted by second annular region 8, a pressure plate 11, and a friction disk 12. Pressure plate 11 is axially movable in order to be brought into contact with friction disk 12 upon transmission of torque between the combustion engine and the input shaft of the gearbox. An annular actuation element or diaphragm 96 axially loads pressure plate 11 against friction disk 12 and reaction plate 8.

In a variant that is not depicted, the clutch can be of the normally open type. In this case it is the rearward motion of a release bearing (not depicted) that allows pressure plate 11 to be loaded, via diaphragm 96, toward reaction plate 8. In a normally open clutch of this kind, diaphragm 96 exhibits appropriate elasticity for returning its fingers to a front, inactive position.

Torsional damper 4 comprises a rear guide washer 13 remote from engine 1 and a front guide washer 14 close to engine 1. Torsional damping device 4 also has a web 15 and a splined hub 16, in this example constituting an integral assemblage. As a variant, web 15 and splined hub 16 could constitute two distinct parts and could be fastened to one another by means of rivets or a weld. Splined hub 16 is intended to interact with splines of complementary shape carried by the rear end (not depicted) of the input shaft of gearbox 2.

Rear guide washer 13 and front guide washer 14 are disposed axially on either side of web 15. Rear guide washer 13 is fastened to friction disk 12 by means of fastening members such as screws or rivets (not depicted). Rear guide washer 13 has at least one hole 107. In an example, rear guide washer 13 has six holes such as 107, distributed circumferentially.

Rear guide washer 13 and front guide washer 14 are furthermore centered and rotationally guided on splined hub 16 respectively by means of a rear bearing 17 and a front bearing 18. Bearings 17 and 18 can each constitute a plain bearing or rolling bearing.

Bearings 17 and 18 each have an L-shape. Rear bearing 17 and front bearing 18 are disposed in abutment against a radial portion 101 of hub 16. Central hub 16 also has a cylindrical portion 102 from which radial portion 101 extends. Cylindrical portion 102 has on an inner periphery a tooth set complementary to that of the rear end of the input shaft of gearbox 2.

Rear 13 and front guide washers 14 each have a respective inner rim 19 and 20 defining an abutment surface for the corresponding bearing. Bearings 17 and 18 furthermore each have a respective radially inner face 21 and 22 that interacts with a respective annular outer surface 23 and 24 of splined hub 16 for rotational driving of bearings 17 and 18 by hub 16. Front bearing 18 constitutes an axial protrusion 99 extending toward the front.

Figure 16:
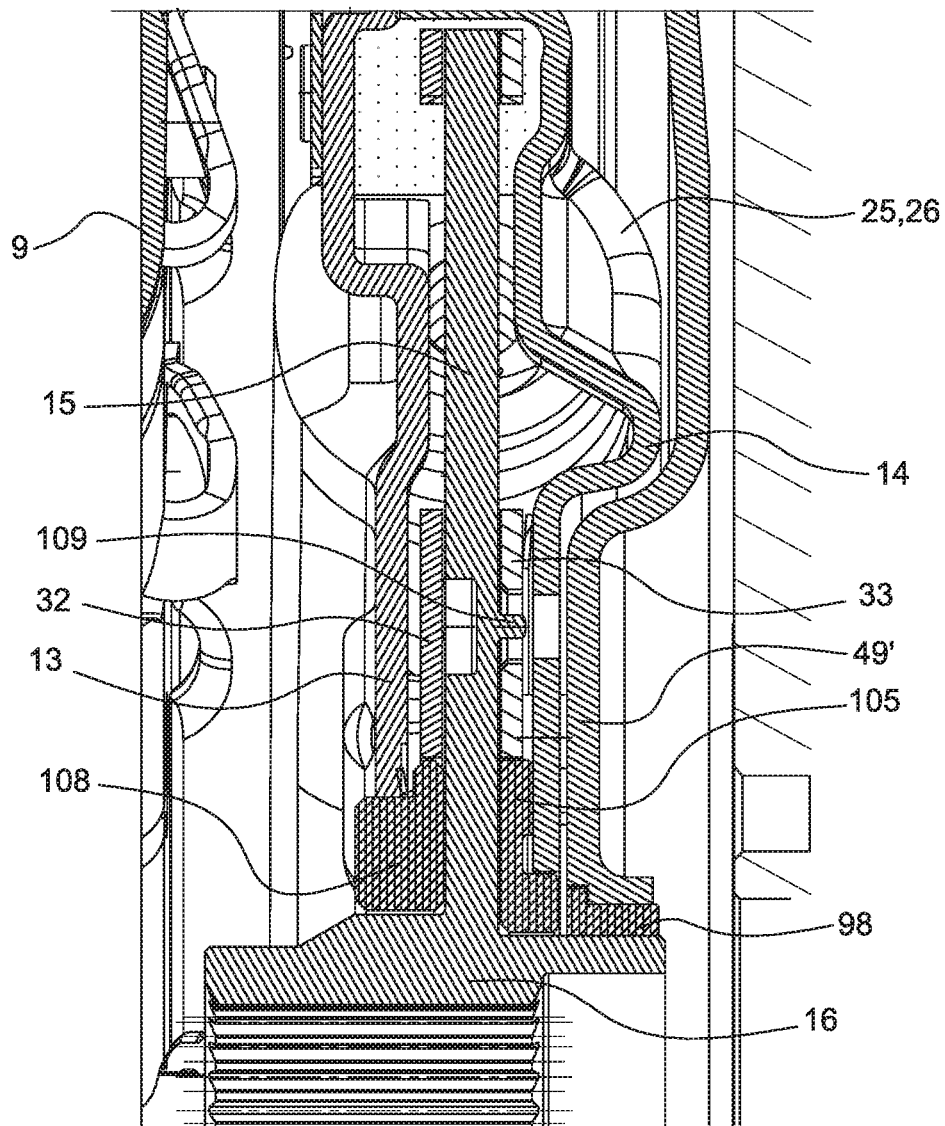
FIG. 16 is a partial section view of a damping device according to an embodiment of the invention.

At least one of bearings 17 or 18 could be replaced by a tapered bearing 105 as illustrated in FIG. 16. This results in a tapered abutment against hub 16 in order to absorb any alignment errors of the input shaft of the gearbox and of the output shaft of the motor.

Torsional damping device 4 furthermore has a plurality of groups of two elastic members 25, 26 ensuring coupling between the two guide washers 13, 14 and web 15. Elastic members 25, 26 here are straight elastic members distributed circumferentially along the same circle around axis X. The springs could be curved.

Each elastic member can have two coaxial springs mounted one inside another. In the embodiment depicted, torsional damping device 4 has three groups of two straight elastic springs.

In FIGS. 3a and 3b the elastic members are received in a receiving chamber defined by indented annular regions such as 27 and 270, configured in the respective guide washers 13 and 14 and extending circumferentially.

In addition, each group of elastic members extends circumferentially, on the one hand between two abutment seats (not depicted) carried by guide washers 13 and 14, and on the other hand between two circumferentially consecutive abutment tabs 59, 60 of web 15.

Specifically, in FIG. 4 web 15 has three abutment tabs 59, 60, and 61. Each of them has two substantially planar abutment faces 62, 63 serving for abutment of the ends of elastic members 25, 26. Tabs 59, 60, 61 of web 15 can furthermore have retaining pins (not depicted) that extend circumferentially on either side of the tabs and allow radial retention of the ends of elastic members 25, 26.

Web 15 is mounted rotationally fixedly on splined hub 16. Web 15 has a radially inner portion 64 and a radially outer portion 65, connected to one another by abutment tabs 59, 60, 61. Radially outer portion 65 constitutes a ring. Note that radially inner portion 64 of web 15 is indistinguishable from radial portion 101 of hub 16. Abutment tabs 59, 60, 61 extend to constitute an angular section that widens in proximity to radially outer portion 65.

Radially inner portion 64 and radially outer portion 65 delimit, radially between two circumferentially successive abutment tabs, a window 70 for accommodating two elastic members 25, 26 of a given group of elastic members.

In an example that is not illustrated, tabs 59, 60, and 61 of web 15 can also have, on their radially outer end, projecting elements configured to interact at a travel limit with stop surfaces carried by at least one of guide washers 13, 14. The angular travel of the guide washers with respect to web 15 is thus limited in order to protect the elastic members.

In FIG. 2 the elastic members of each group are mounted in series by means of at least one phasing member 32, 33. In the example according to the invention, the phasing member is constituted by two phase washers, a rear phase washer 32 and a front phase washer 33. The two phase washers 32, 33 are mounted freely rotatably with respect to guide washers 13, 14 on the one hand, and with respect to web 15 on the other hand. The two phase washers 32, 33 are disposed on either side of web 15. The two phase washers 32 and 33 are coaxial.

Phase washers 32, 33 are each spaced axially away from second web 15 by a minimum operating clearance, for example 0.1 to 1 mm.

Phase washers 32, 33 are centered and rotationally guided on splined hub 16 by web 15. To achieve this, rear phase washer 32 and front phase washer 33 respectively have on their inner periphery a front lateral face 34 and a rear lateral face 35 intended respectively to end up facing, or in fact to come into contact with, a rear lateral face 36 and a front lateral face 37 of web 15, at a location where inner annular portion 64 of web 15 is located. Note that axial protrusion 99 of bearing 18 serves as an axial abutment face for front phase washer 33.

Figure 6:
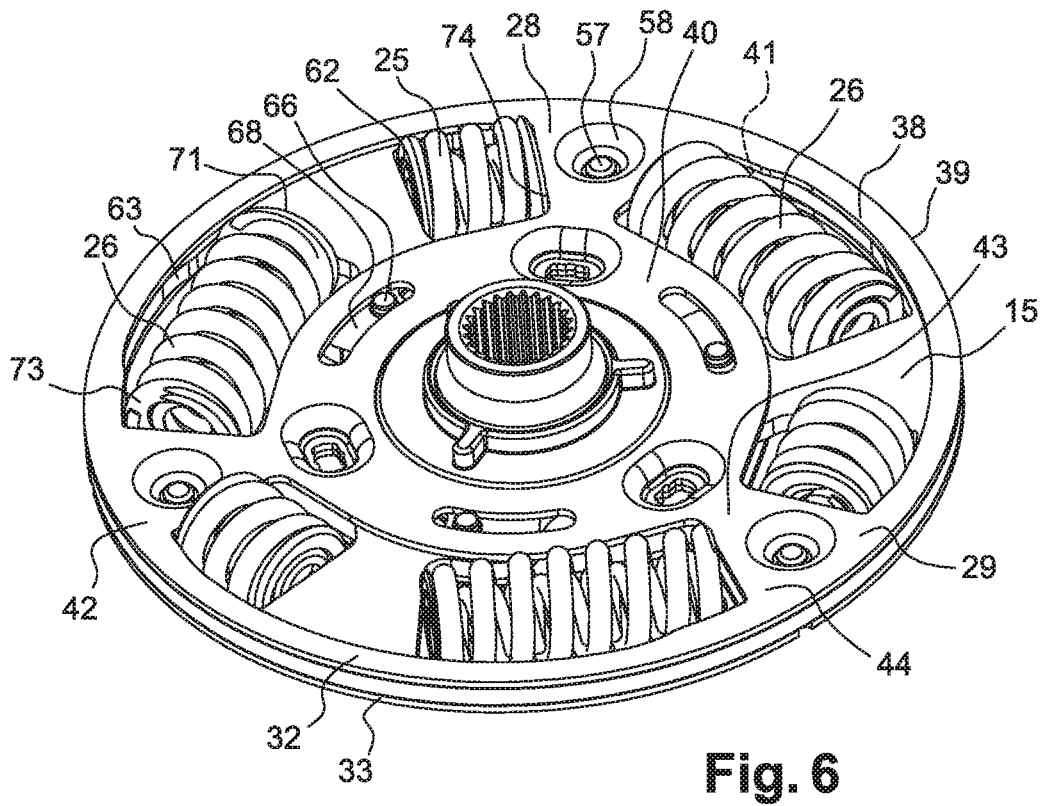
FIG. 6 is a perspective depiction of a first face of the phasing member according to an embodiment of the invention.

In FIGS. 2 and 6, phase washers 32, 33 are moreover non-rotatably connected to one another by at least one connecting means 57. The two phase washers 32, 33 are each constituted by a metal sheet. Rear phase washer 32 has, at the location where the connection of the two phase washers 32, 33 to one another is made, an indented shape 58 allowing the two phase washers 32, 33 to move locally closer to one another. This proximity ensures axial and radial retention between phase washers 32, 33, and also with respect to web 15.

In the example according to an embodiment of the invention, it is rear phase washer 32 that has indentation 58, but it could be constituted only by front phase washer 33 or also by both phase washers 32, 33.

In the example, front phase washer 33 is planar.

In FIG. 6 each of the phase washers has radial phasing tabs such as 28, 29, 42, which are each intercalated between a first elastic member 25 and a second elastic member 26 so that the two consecutive elastic members 25, 26 of a given group are arranged in series. Radial phasing tabs 28, 29, 42 have two substantially planar abutment faces 73, 74 that form an angle between them and serve for abutment of the ends of elastic members 25, 26. Each radial phasing tab can furthermore have, at its radially outer edge, two opposite outer retaining pins (not depicted), which extend on either side of each radial phasing tab and allow the ends of the elastic members to be radially and axially retained.

Phasing member 32, 33 is such that a deformation of the elastic members in phase with one another is ensured, so that the elastic forces generated in torsional damping device 4 are circumferentially distributed in homogeneous fashion.

Each group thus has, during operation, a first elastic member 25 abutting at a first end against an abutment seat carried by guide washers 13, 14 and at a second end against a radial phasing tab 28, 29, 42 of phasing member 32, 33, while second elastic member 26 abuts at a first end against said radial phasing tab 28, 29, 42 of phasing member 32, 33 and at a second end against an abutment tab 59, 60, 61 of web 15. A driving torque is thus transmitted from guide washers 13, 14 to web 15 by means of elastic members 25, 26.

Each of the phase washers, rear 32 and front 33, has a radially outer region 38, 39 spaced away from one another (FIG. 6).

Each of the phase washers, rear 32 and front 33, has a radially inner region 40, 41 spaced away from one another (FIG. 6).

Phasing tabs 28, 29, 42 extend radially from radially inner region 40, 41 of each of the phase washers 32, 33 toward radially outer region 38, 39, having a proximal end 43 close to radially inner region 40, 41 which is narrower than a distal end 44 remote from radially inner region 40, 41. Phasing tabs 28, 29, 42 extend in the form of an angular sector.

Indentation 58 is implemented at these phasing tabs, preferably at a location close to radially outer region 38, 39.

Delimited circumferentially between two phasing tabs, and between the radially inner region and the radially outer region, is a window 71 allowing the reception of two elastic members or springs 25, 26. In the example illustrated in FIG. 6, spring 25 has a length, measured circumferentially, that is less than the length of second spring 26. The opposite case is also conceivable, however, with the length of spring 25 being greater than that of second spring 26 (example not illustrated).

Web 15 and phase washers 32, 33 have the same radius. Neither web 15, nor phase washers 32, 33, go beyond one another. The damping device according to the invention is thus, advantageously, radially compact.

Figure 5:
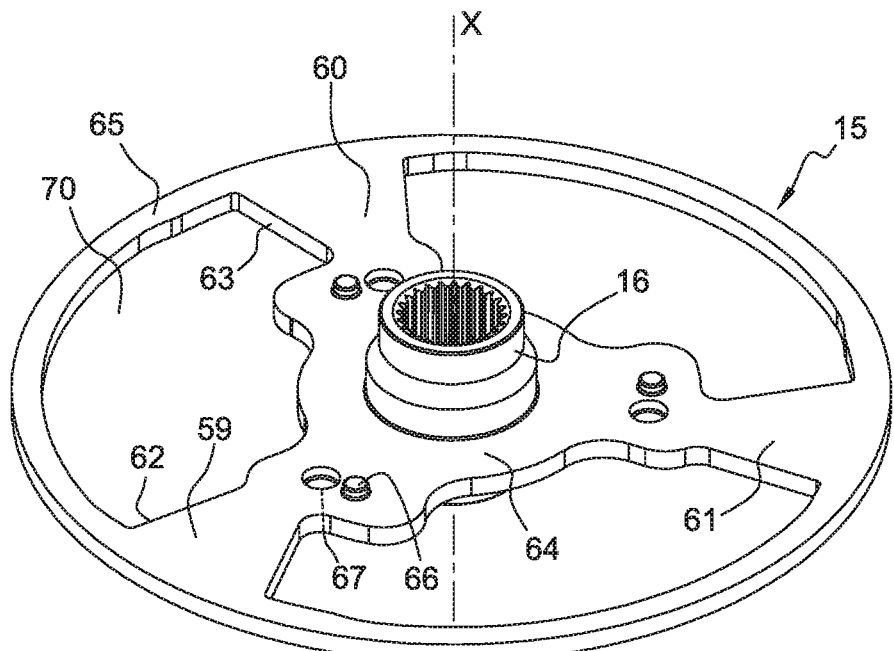
FIG. 5 is a perspective depiction of a web of a torsional damping device according to an embodiment of the invention.
Figure 7:
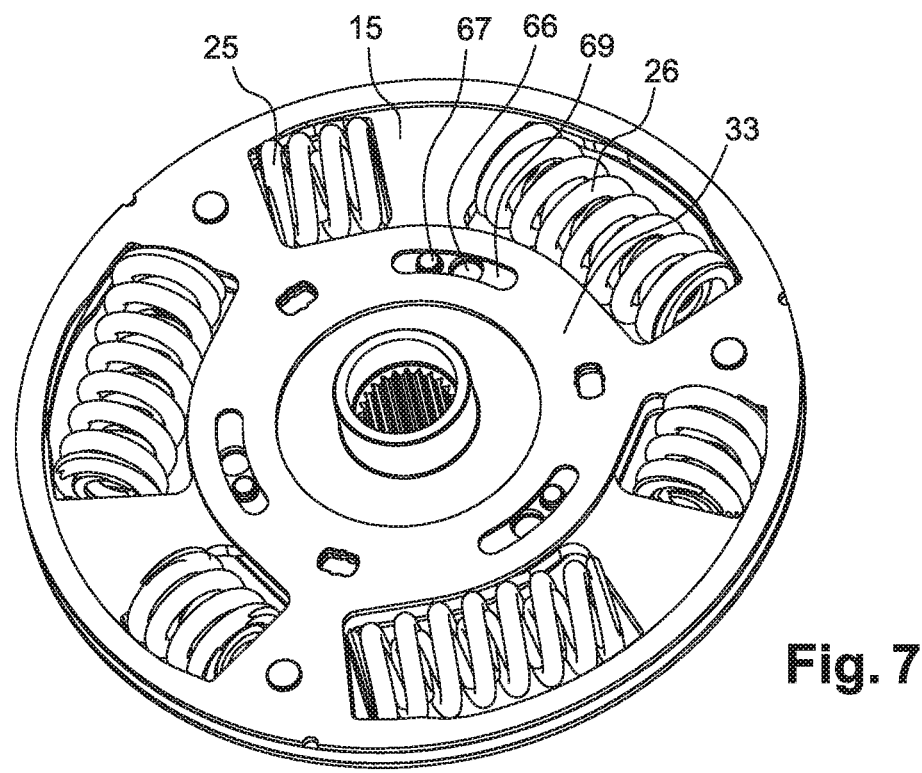
FIG. 7 is a perspective depiction of a second face of the phasing member according to the same embodiment as that of FIG. 6.

In the embodiment depicted in FIGS. 5 and 7, web 15 has at least one rear axial stud 66 and at least one front axial stud 67. Each of these studs 66, 67 constitutes a protrusion that extends axially with respect to rotation axis X of damping device 4 and with respect to the plane in which web 15 extends.

Rear phase washer 32 and front phase washer 33 also each have at least one receptacle 68, 69 constituted through each of the phase washers (FIGS. 5 and 7). The receptacle is preferably oblong in shape.

Axial stud 66, 67 and the corresponding receptacle 68, 69 are arranged with respect to one another in such a way that the axial stud becomes inserted through the receptacle. The axial studs constitute stop means that limit the relative rotation of web 15 and of front and rear phase washers 32, 33 in two opposite rotation directions, i.e. in the forward direction (D) (FIG. 4a) or reverse direction (R) (FIG. 4b).

Axial stud 66, 67 is situated circumferentially between two tabs of the web. More specifically, axial stud 66, 67 is situated radially between splined hub 16 and window 71 that receives two elastic members 25, 26, and axially between radially inner portion 64 and tab 59, 60, 61.

Rear phase washer 32 and front phase washer 33 each respectively have three receptacles such as 68 and 69, each intended to receive a respective stud such as 66 and 67. Each of the studs is intended to come into abutment against an edge of receptacle 68, 69.

Stud 66, 67 can be constituted by a peg distinct from web 15 (example not depicted) which is inserted through web 15 by press-fitting, or fastened by welding or riveting. The peg can then be designed so that at least one end of said peg projects from web 15. As a variant, the peg projects from both sides of web 15.

Figures 8B, 8C:
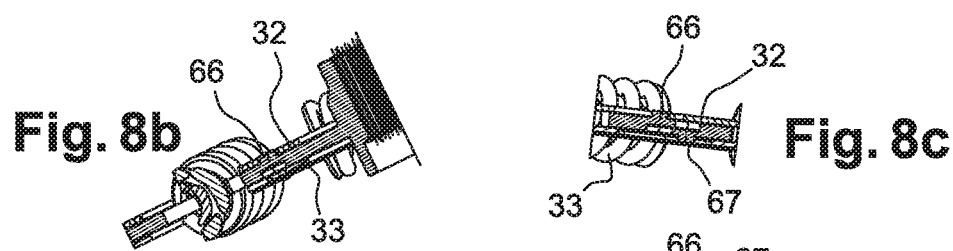
Figure 8A:
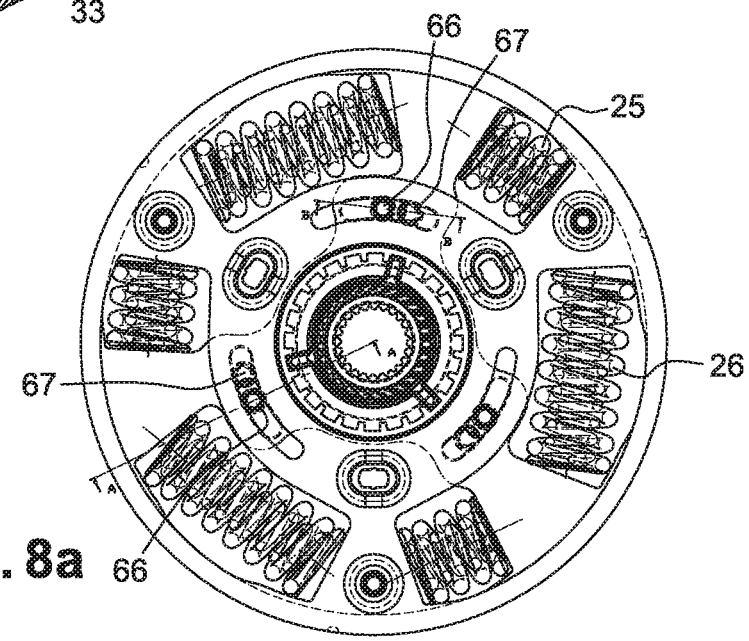
FIG. 8a is a schematic depiction of the damping device according to an embodiment of the invention.

In FIGS. 5, 7, 8a, 8b, 8c the stud is implemented by material extrusion. In the example of the invention, stud 66 is intended to interact with rear phase washer 32, and stud 67 is intended to interact with front phase washer 33. Studs 66 and 67 are each constituted on the same circle. FIG. 8a illustrates the damping device, and FIGS. 8b and 8c respectively illustrate sections of the damping device along a first section A and along a second section B passing respectively through stud 66 and through the two studs 66 and 67.

In a variant that is not illustrated, the two studs 66 and 67 could be radially aligned.

The rear phase washer 32 and the front phase washer 33 are also non-moveably connected to one another by means of a connecting member 52 constituting a connecting spacer 52.

According to an embodiment of the invention, the connecting member (or spacers 52 is disposed on the same circle as the one on which the studs 66, 67 are constituted (or disposed). Thus, the connecting member 52 is situated radially between the splined hub 16 and the window 71 that receives two elastic members 25, 26, i.e., positioned radially internally with respect to the elastic members 25.

In FIG. 2, damping device 4 also has a pendulum damper 48 comprising a support member 49 and a plurality of pendulum flyweights 50 distributed circumferentially on support member 49. Support member 49 of pendulum damper 48 constitutes a disk which has a first portion that extends radially and a second portion that extends axially. The second portion is intended to come into abutment against bearing 18. In the example, the second portion of support member 49 extends toward the front.

Support member 49 has receiving orifices 51 that allow the passage of connecting member 52, such as rivets, allowing support member 49 to be integrated with rear phase washer 32 and front phase washer 33. The fastening of support member 49 to rear phase washer 32 and front phase washer 33 is implemented through an orifice 53 constituted through front guide washer 14. According to an embodiment of the invention, orifice 53 is oblong in shape and extends circumferentially over a length defined so that connecting member 52 does not come into contact with an edge of said orifice 53, regardless of the operating conditions of the transmission assemblage. Hole 107 constituted through rear guide washer 13 serves for passage of connecting member 52 upon assembly of device 4.

Connecting member 52 thus connects the two phase washers 32, 33 to one another, and connects pendulum damper 48 to the two phase washers 32, 33. In an embodiment of the invention, connecting member 52 is fastened by riveting onto the support member of pendulum 49.

In the example, receptacles 68 and 69 and orifices 51 and 53 extend along a circle of the same radius.

Fastening member 52 also constitutes a spacer between phase washers 32, 33 and support member 49.

In addition, support member 49 is offset axially toward the front and extends between front guide washer 14 and inertial wheel 3. Pendulum flyweights 50 are mounted at an outer end of support member 49. In the example of FIG. 2, pendulum flyweights 50 are installed radially outside the elastic members. Pendulum flyweights 50 can thus be installed at a relatively long radial distance from axis X, the result being to achieve optimum filtering performance for pendulum oscillator 48.

Flyweights 50 are capable of oscillating with respect to support member 49 in a plane orthogonal to rotation axis X in reaction to rotational inconsistencies. Each flyweight 50 has two flanks 54, 55 that extend axially on either side of support member 49 and are connected axially to one another by means of two connecting spacers such as 56. The operation of such flyweights is well known per se and will not be described further here. Other architectures for pendulum damper 48 are also conceivable.

Receptacles 68 and 69, constituted respectively through rear phase washer 32 and through front phase washer 33, are located on the same circle as the one along which orifice 53 is constituted. In an embodiment of the invention, orifice 53 extends along a circular arc larger than the one along which receptacles 68 and 69 extend.

In the embodiment depicted in FIG. 2, rear guide washer 13 and front guide washer 14 define a sealed receiving chamber 45 for elastic members 25, 26, which is filled with a lubricating agent such as grease.

In order to ensure sealing of receptacle 45, the fastening of rear guide washer 13 and front guide washer 14 can be implemented by sealed welding. Specifically, the two guide washers, rear 13 and front 14, are rotationally integral with one another. Guide washers 13 and 14 are continuously connected to one another over their entire external peripheral contour. Other embodiments are possible; for example, guide washers 13 and 14 can be assembled by bolting using a gasket, or by riveting with or without a gasket.

In an embodiment that is not depicted, a ring constituting a spacer could be inserted between the two guide washers, for example at their radially outer region, in order to maintain the required axial spacing between the guide washers.

Figure 12:
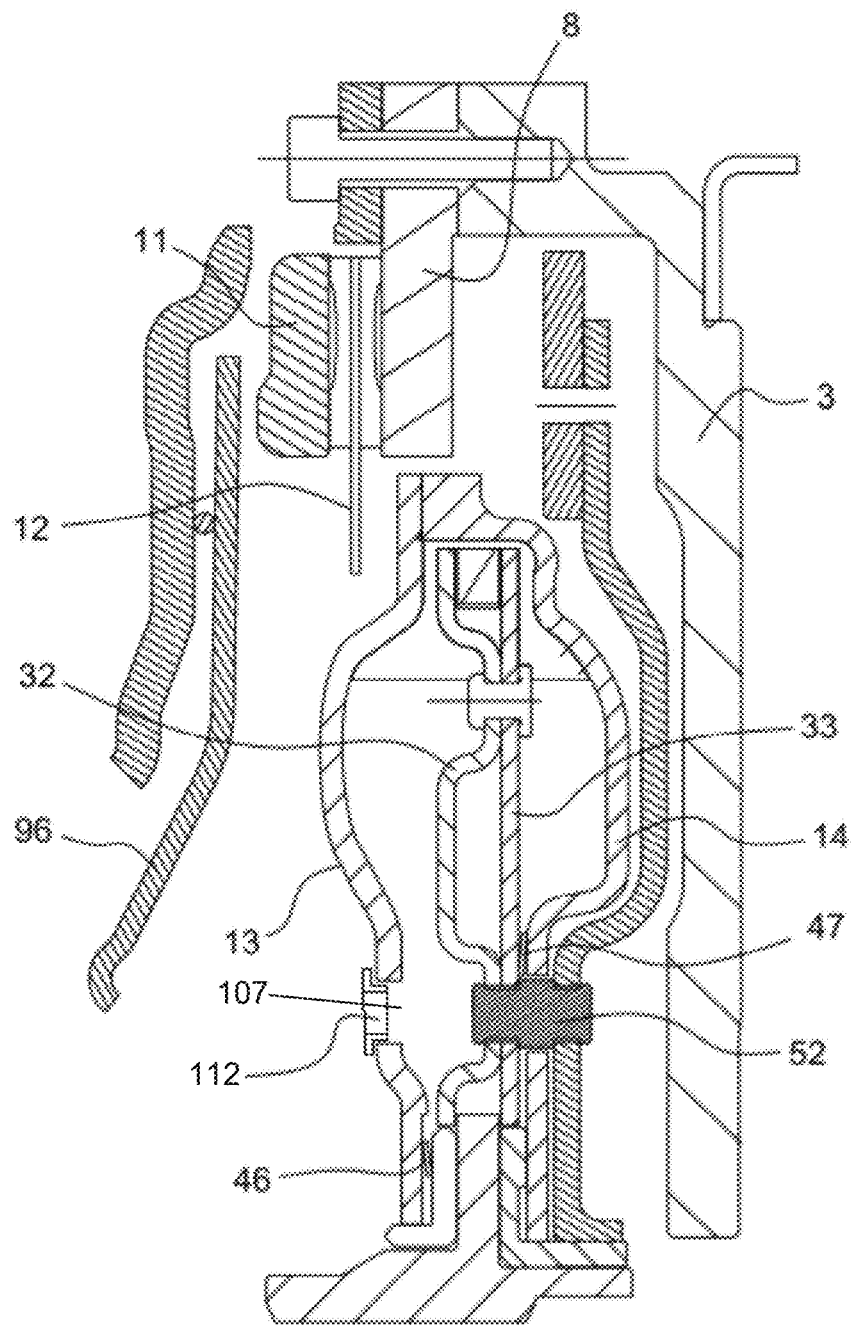
FIG. 12 is a depiction of a damping device according to an embodiment of the invention.

In addition, torsional damping device 4 is equipped with sealing means 46, 47 (FIG. 12). In the interest of clarity, all elements identical to those of FIG. 2 are labeled with the same reference numbers. FIG. 12 is a simplified depiction of FIG. 2. These sealing means 46, 47 have an elastically deformable first sealing washer 46 placed between web 15 and rear guide washer 13, ensuring sealing between web 15 and rear guide washer 13. These sealing means also have a second sealing washer 47 placed between front phase washer 33 and front guide washer 14, ensuring sealing between front phase washer 33 and front guide washer 14.

Figure 13:
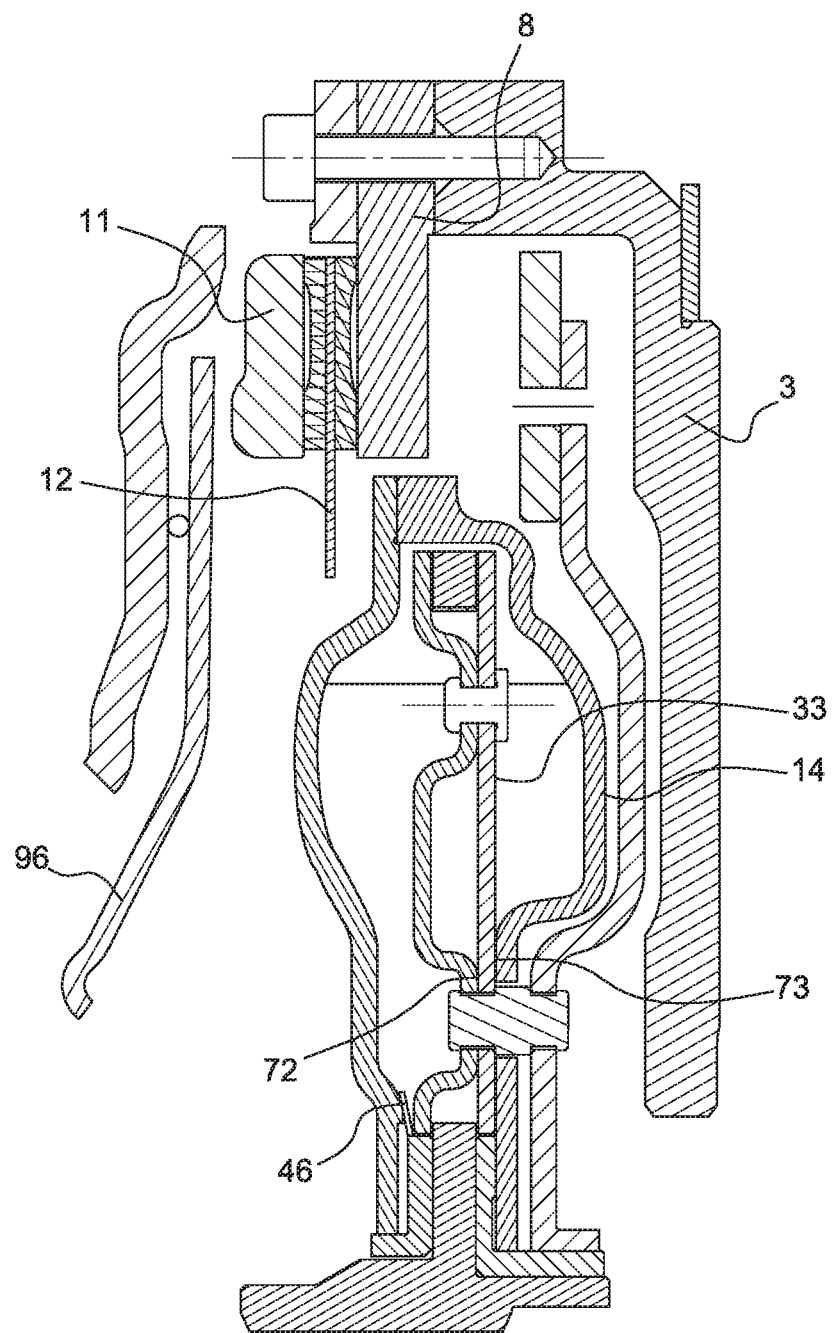
FIG. 13 is a depiction of a damping device according to a variant of the invention.

Other sealing means can be provided. In particular, FIG. 13 depicts a variant of the embodiment depicted in FIG. 12, in which the position of front phase washer 33 with respect to front guide washer 14 is depicted. As in FIG. 12, elements identical to the elements described for FIG. 2 have the same references in FIG. 13.

Front phase washer 33 forms a first planar portion 72 adjoined against a second planar portion 73 constituted by front guide washer 14. The planar-to-planar adjoining of front phase washer 33 onto front guide washer 14 allows sealing between those two elements to be ensured. This planar-to-planar adjoining of front phase washer 33 and front guide washer 14 can be associated, or not, with the presence of second sealing washer 47.

The device as illustrated in FIG. 13 differs from the device as illustrated in FIG. 12 by the absence of sealing washer 47 between front guide washer 14 and front phase washer 33.

Figure 9:
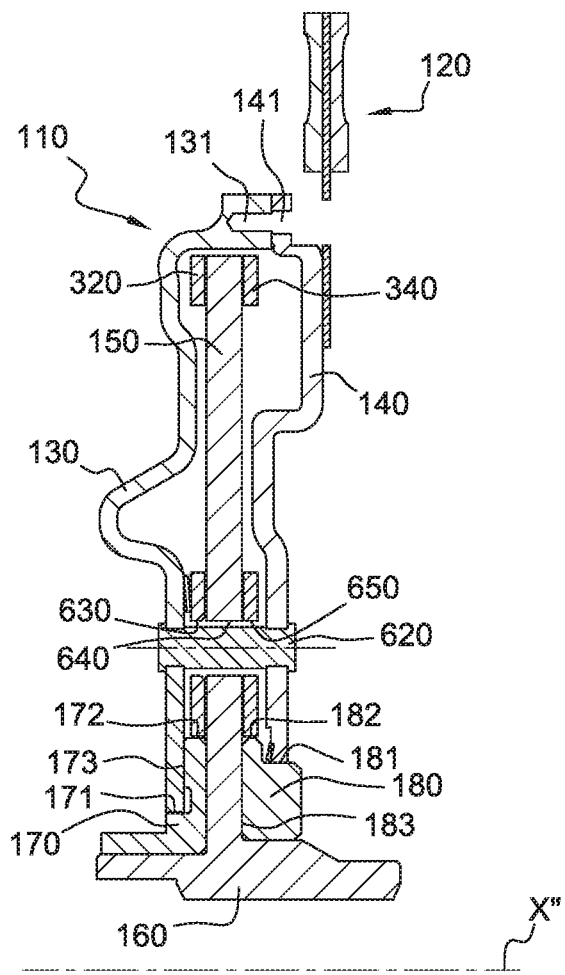
FIG. 9 is a depiction of a damping device comprising a stop element, according to an embodiment of the invention.
Figure 10:
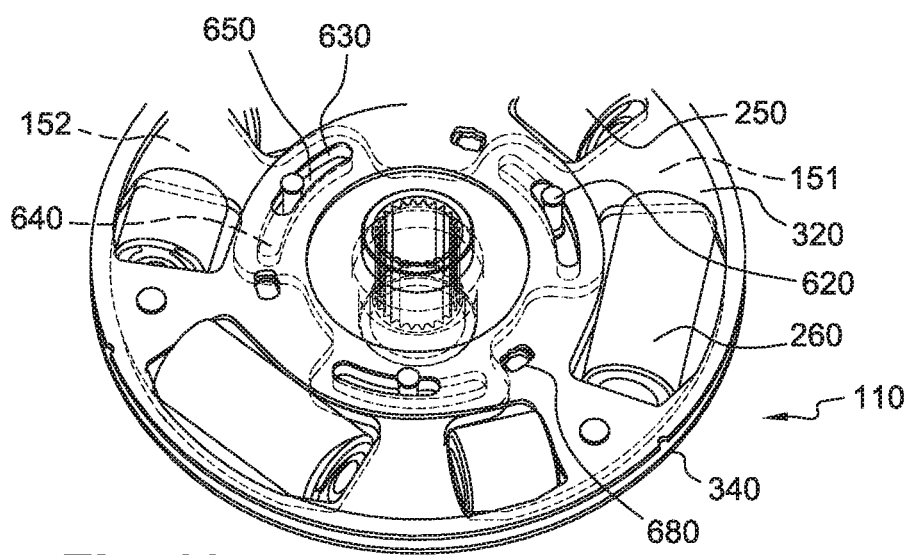
FIG. 10 is a perspective view of the damping device according to FIG. 9, according to an embodiment of the invention.

FIGS. 9 and 10 illustrate another embodiment of the invention in which a front guide washer 130 and a rear guide washer 140 are connected to one another by means of at least one connecting spacer 620. Several connecting spacers such as 620 can be disposed circumferentially. In the example illustrated, three connecting spacers such as 620 are provided.

This connecting spacer 620 allows the two guide washers to be connected to one another. This connecting spacer 620 also constitutes a limit stop for front guide washer 130 and for rear guide washer 140 with respect to front phase washer 320 and rear phase washer 330, and with respect to web 150. Connecting spacer 620 constitutes a stop that can be referred to as "telescoping," since upon rotation of the two guide washers 130 and 140, connecting spacer 620 is capable of coming into contact with phase washers 320 and 330 and then with web 150.

For this, front phase washer 320, rear phase washer 340, and web 150 have respective receptacles 630, 640, 650 configured to allow connecting spacer 620 to pass (FIG. 10). Receptacles 630, 640, 650 are also configured in such a way that the connecting spacer is capable of coming to a stop against an edge of the receptacle of front phase washer 320 and another corresponding edge of rear phase washer 340, then comes into abutment against an edge of the receptacle of web 150 at a later time. Connecting spacer 620 is located close to axis X" of the device.

A pendulum damper (not illustrated) can also be provided and can be connected to phase washers 320 and 340 by means of connecting spacer 620, similar to connecting spacer 52 as described previously. Or else another connecting spacer, distinct from the one serving as a stop, can be provided. This other spacer would then pass through guide washer 140. The placement of this other connecting spacer is represented by an orifice 680 constituted through each of phase washers 320 and 340. This orifice 680 is located on the same circle as the one on which connecting spacer 620 is located. This orifice 680 is located between two tabs 151 and 152 of web 150. As a variant that is not illustrated, however, web 150 could also have oblong receptacles so as to allow passage of the other connecting spacer and deflection of phase washers 320 and 340.

In the example as illustrated in FIGS. 9 and 10, web 150 is connected to a hub 160 capable of being rotationally connected to an input shaft of a gearbox. In this example, web 150 is in one piece with hub 160, but could be constituted by a part distinct from hub 160. A front bearing 170 is disposed between front guide washer 130 and hub 160. A rear bearing 180 is disposed between rear guide washer 140 and hub 160. Front bearing 170 is disposed between front phase washer 320 and hub 160. Rear bearing 180 is disposed between rear phase washer 330 and the same hub 160. Front bearing 170 and rear bearing 180 are each L-shaped, having a respective first axial abutment face 171, 181 and a respective second axial abutment face 172, 182. The first abutment face of bearings 170 and 180 is capable of receiving a radially inner end respectively of front guide washer 130 and of rear guide washer 140. The second abutment face of bearings 170 and 180 is capable of receiving a radially inner end of front phase washer 320 and of rear phase washer 330.

Front bearing 170 and rear bearing 180 have a respective third radial abutment face 173 and 183, intended to come into abutment against a corresponding face respectively of front guide washer 130 and of rear guide washer 140.

Guide washers 130, 140 can constitute the torque input element in so-called "forward" mode, web 150 then constituting the torque output element. Guide washers 130, 140 can likewise constitute the torque output element in so-called "reverse" mode, web 150 then constituting the torque input element. Rear guide washer 140 is connected to a friction disk 120.

Guide washers 130, 140 are also connected to one another by at least one fastening means (not depicted). Guide washers 130, 140 have for that purpose orifices 131 and 141 for passage of the fastening means. In an example, the fastening means can be a screw that can be inserted through passage orifices 131 and 141. In the example of FIG. 9, passage orifices 131 and 141 are located at the radially external periphery of the guide washers, while receptacles 630, 640, and 650 that receive connecting spacer 620 are intended to be located at the radially inner periphery of guide washers 130, 140.

Figure 11:
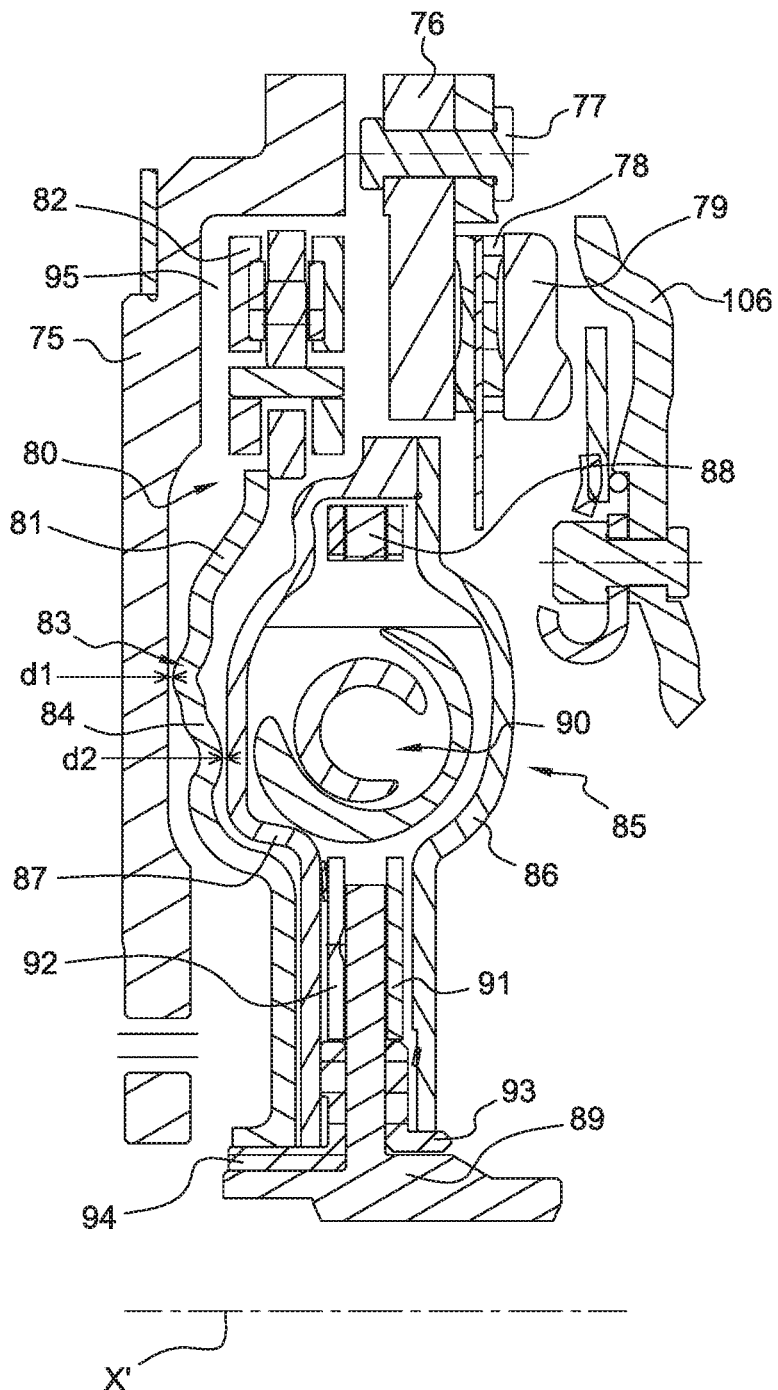
FIG. 11 is a depiction of a transmission assemblage according to an embodiment of the invention.

FIG. 11 depicts an assemblage comprising an engine flywheel or inertial wheel 75 capable of being connected to the output shaft of the engine, a reaction plate 76 mounted rotationally fixedly to inertial wheel 75 by means of rivets or screws (not depicted). The assemblage also comprises a friction disk 78 capable of being gripped between reaction plate 76 and a pressure plate 79 in order to allow rotational coupling of inertial wheel 75 to the gearbox. Reaction plate 76, friction disk 78, and pressure plate 79 are part of a disk-type clutch. Cover 106 is fastened to reaction plate 76 by means of fastening rivet 77.

The assemblage as illustrated in FIG. 11 also has a pendulum damper 80 intended to be coupled to the input shaft of the gearbox. Pendulum damper 80 has a support member 81 and pendulum flyweights 82 mounted movably on support member 81. Pendulum damper 80 is located between inertial wheel 75 and the input shaft of the gearbox. Pendulum damper 80 has anti-tilt means 83 that are designed so that support member 81 and inertial wheel 75 interact with one another so as to maintain support member 81 axially in position with respect to inertial wheel 75.

Support member 81 has corrugated shapes 84 capable of interacting with inertial wheel 75 in the event of tilting of support member 81.

Corrugated shapes 84 constitute waves that extend at least partly circumferentially. These shapes and/or inertial wheel 75 can be covered with a substance allowing easy slippage, without friction, of these shapes against inertial wheel 75.

As a variant, these shapes 84 can be replaced at least in part by pegs (not depicted). As a variant, the shapes or the pegs could be carried by inertial wheel 75.

Shapes 84 are located at a distance from rotation axis X' of said assemblage in such a way that they are able to come into contact with inertial wheel 75 or with support member 81 in the event of tilting of support member 81, in order to prevent any contact between pendulum flyweights 82 and inertial wheel 75 and/or reaction plate 76. In the example illustrated in FIG. 11, in the inactive position support member 81 is spaced axially away from inertial wheel 75 by a distance d1. This distance is measured along an axis that is parallel to rotation axis X'. To prevent any contact with reaction plate 76, support member 81 is also, in an inactive position, spaced away by a distance d2 from a torsional damper 85 coupled to friction disk 78. Distance d2 is also measured along an axis parallel to rotation axis X'.

The assemblage also has a torsional damper 85 coupled to friction disk 78. Torsional damper 85 comprises a rear guide washer 86 and a front guide washer 87. Rear guide washer 86 and front guide washer 87 are coupled to friction disk 78. Torsional damper 85 also has a web 88 rotationally coupled to a central hub 89 that constitutes an integral part with web 88. Central hub 89 is capable of being coupled to the input shaft of the gearbox.

At least one group of elastic members 90 is mounted between guide washers 86 and 87 and web 88. These elastic members 90 act against rotation of inertial wheel 75/reaction plate 76 with respect to web 88/hub 89.

Anti-tilt means 83 and the group of elastic members 90 are preferably situated on the same circumference.

Support member 81 more specifically is spaced away from front guide washer 87 by a distance d2.

Support member 81 exhibits at least one corrugated shape 111 capable of interacting with front guide washer 87 in the event of tilting of said support member 81. As a variant that is not depicted, this corrugated shape can also be present on front guide washer 87. As with shapes 84, these shapes 110 and/or front guide washer 87 can be covered with a substance allowing easy slippage, without friction, of these shapes against front guide washer 87.

As previously, elastic members 90 of the group are arranged in series by means of a rear phase washer 91 and a front phase washer 92 that are mounted freely rotatably with respect to guide washers 86, 87 and with respect to web 88, so that the elastic members of each group deform in phase with one another.

Rear phase washer 91 and front phase washer 92 are fixedly connected together.

A rear bearing 93 and a front bearing 94 are disposed on either side of web 88. Support member 81 is coupled indirectly to the torque input shaft of the gearbox by the fact that support member 81 is fastened on front bearing 94. Each of these bearings 93, 94 is rotationally coupled to hub 89.

Pendulum flyweights 82 preferably are disposed radially outside torsional damper 85.

Inertial wheel 75 and reaction plate 76 constitute a receptacle 95 into which pendulum flyweights 82 are inserted.

Friction means can be provided, fastened onto inertial wheel 75 or onto the sheet metal of pendulum support member 84 or onto front guide washer 87.

Figure 14:
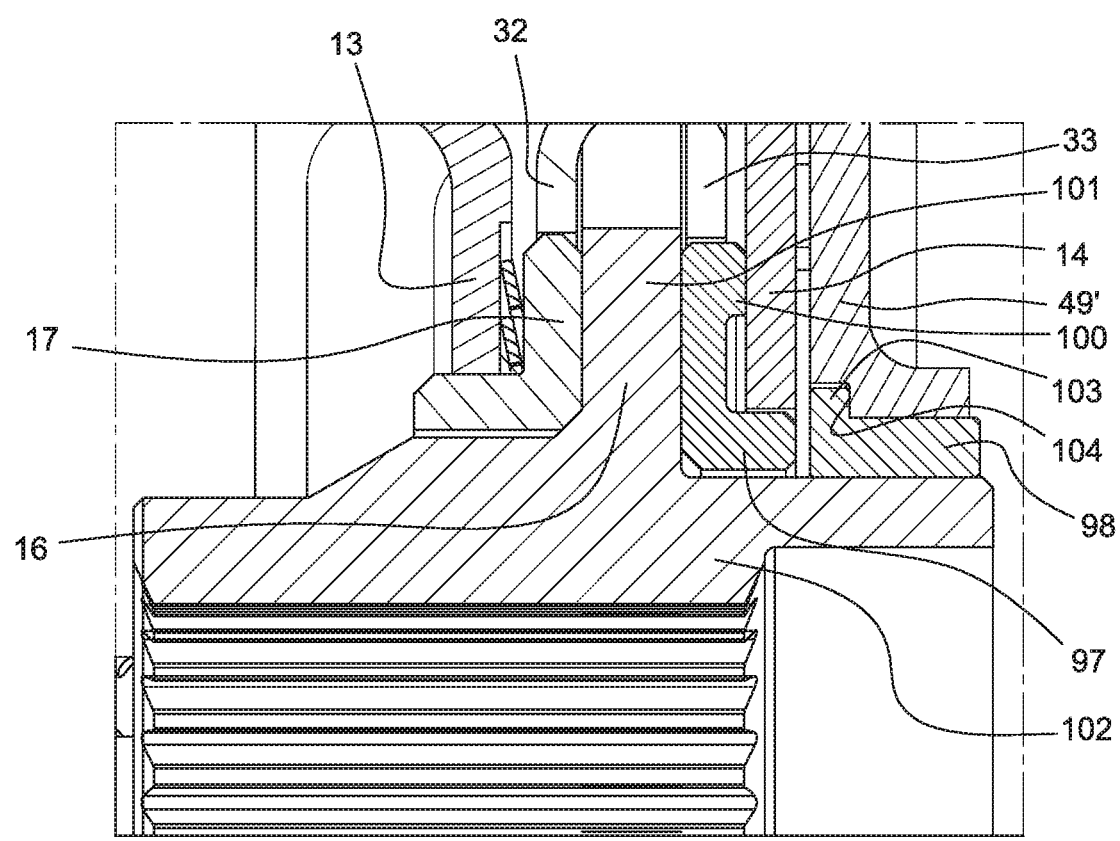
FIG. 14 is a partial section view of a damping device according to a variant of the invention.
Figure 15:
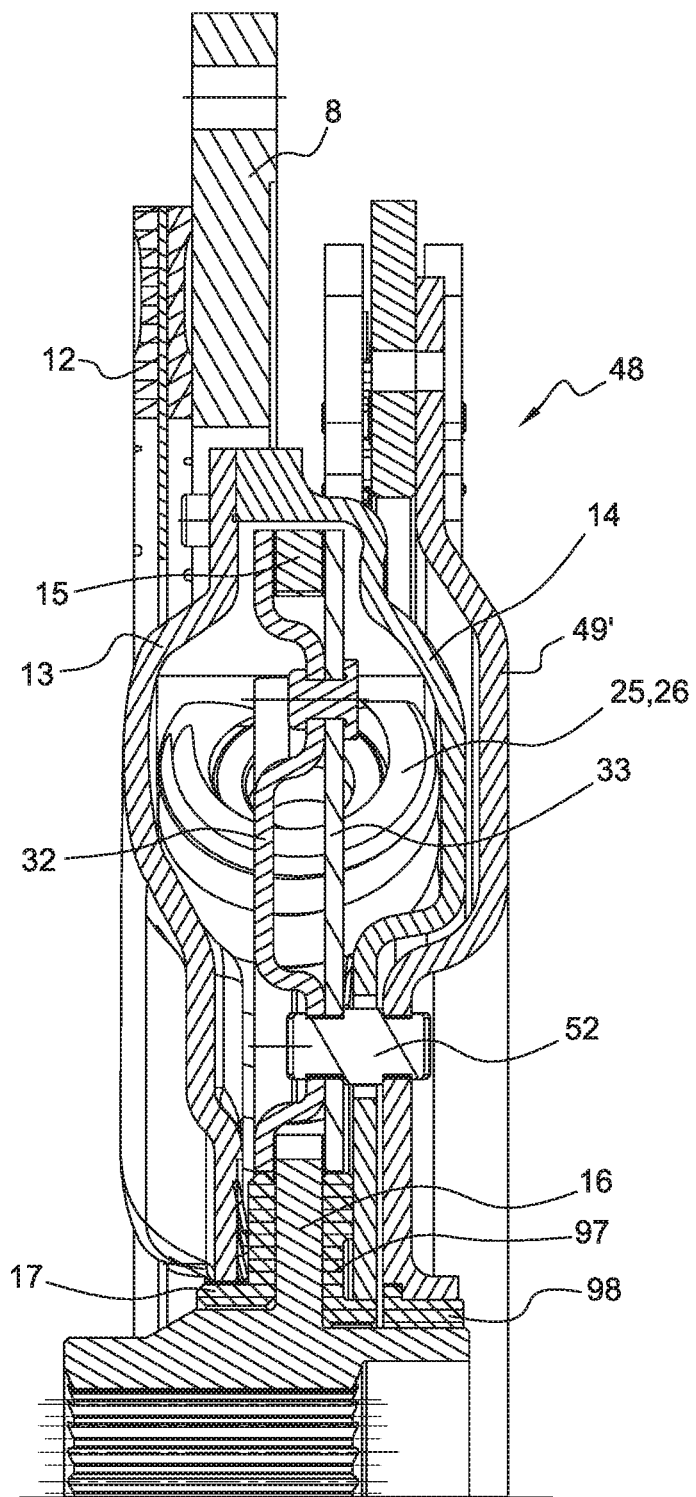
FIG. 15 is a section view illustrating a damping device according to the variant illustrated in FIG. 14.

As a variant, FIGS. 14 and 15 illustrate a bearing 17 identical to the one illustrated in FIG. 2 and to the other bearing constituted by two distinct parts 97 and 98. Each of the distinct parts can constitute a plain bearing or rolling bearing. The identical elements illustrated in FIG. 14 and in FIG. 2 have the same reference numbers. First part 97 is rotationally fixed with respect to hub 16, while second part 98 constitutes a cylindrical part mounted adjoiningly on hub 16. First part 97 also has an axial protrusion 100 extending toward the front, intended to serve as an axial abutment face for front phase washer 33. First part 97 serves to center front guide washer 14. Second part 98 allows pendulum support member 49' to be centered. Second part 98 constitutes an axial stop 103, and the radially inner periphery of pendulum support 49' extends axially and has a surface 104 complementary to axial stop 103. Axial stop 103 is configured so as to prevent axial displacement of pendulum support 49' toward radial portion 101 of hub 16.

FIG. 16 illustrates a damping device having tapered bearing 105 serving as a support for front phase washer 33. FIG. 16 also illustrates an axial stud 109 carried by web 15 and serving as a stop for rear phase washer 32 and front phase washer 33. Another bearing 108 is also depicted, and serves to support rear guide washer 13. Bearing 98 is positioned between hub 16 and support member 49.

A transmission assemblage comprising a damping device as described above is assembled in the following manner: Front phase washer 32 and rear phase washer 33 are installed on either side of web 15. The elastic members are then inserted into windows 71 and 70 respectively of phase washers 32, 33 and of web 15. Front guide washer 14 is placed against front phase washer 33. Rear guide washer 13 is placed against rear phase washer 32. Connecting member 52 is then inserted through rear guide washer 13. Pendulum support member 49 is placed onto front guide washer 14. Connecting member 52 is then fastened onto pendulum support member 49.

More specifically, before the installation of support member 49 on front guide washer 14, provision is made to fasten friction disk 12 onto rear guide washer 13, and to place reaction plate 8 onto a first face of friction disk 12 situated facing pendulum damper 48. Pressure plate 11 is then placed facing a second face of friction disk 12, said second face being opposite to the first face. The clutch mechanism constituted by cover 9 and diaphragm 96 is then connected to reaction plate 8.

Subassemblies are firstly constituted separately from one another. Pendulum damper 48 is assembled by mounting pendulum weights on support member 49. The clutch mechanism 9, 96 is also assembled. Lastly, rear guide washer 13 and front guide washer 14, rear phase washer 32 and front phase washer 33, as well as web 15 and springs 25 and 26, are installed in order to constitute a subassembly in the form of a hollow disk, to which friction disk 12 is fastened. The clutch mechanism 9, 96, reaction plate 8, and the disk-shaped subassembly are then assembled. Connecting member 52 is inserted through rear guide washer 13. Pendulum damper 48 is installed onto front guide washer 14 by riveting connecting member 52. The hole 107 is then filled using a sealing stopper 112 as best shown in FIGS. 2 and 12.

Concurrently, inertial wheel 6 is coupled to the crankshaft of an engine. The subassembly constituted by the clutch mechanism 9, 96, reaction plate 8, pressure plate 11, clutch disk 12, and damping device 4 is then mounted on inertial wheel 6.

Although the invention has been described in conjunction with several specific embodiments, it is very apparent that it is in no way limited thereto and that it comprises all technical equivalents of the means described as well as combinations thereof, if the latter are within the framework of the invention. In particular, a clutch or a torque converter can be disposed in the transmission system between the output of the elastic-member damper and the input shaft of the gearbox.

Use of the verb "have," "comprise," or "include," and of conjugated forms thereof, does not exclude the presence of elements or steps other than those set forth in a claim. Use of the indefinite article "a" or "an" for an element or step does not, unless otherwise indicated, exclude the presence of a plurality of such elements or steps.

In the claims, any reference character in parentheses cannot be interpreted as a limitation of the claim.

The invention claimed is:

1. A vibration damping device (330) for a motor vehicle, the vibration damping device (330) comprising:
    a first movable element (13, 14) and a second movable element (15, 16) both rotatable around an axis X, the first movable element (13, 14) and the second movable element (15, 16) being coaxial, rotatable with respect to one another and capable of transmitting torque;
    at least one group of two elastic members (25, 26) mounted between the first movable element and the second movable element and acting against rotation of the first movable element and the second element with respect to one another; and
    a phasing member (32, 33) rotationally movable around the axis X, the phasing member (32, 33) including a first portion (32) and a second portion (33), for arranging the elastic members of the at least one group in series so that the two elastic members of the at least one group deform in phase with one another;
    the first portion (32) and the second portion (33) of the phasing member (32, 33) non-moveably connected by a connecting member (52) positioned radially internally with respect to the two elastic members (25, 26) of the at least one group of two elastic members (25, 26);
    the first movable element including a first portion (13) and a second portion (14), the first portion of the first movable element and the second portion of the first movable element being connected to one another so as to delimit a space (45) inside which the second movable element and the phasing member are received;
    the space (45) delimited by the first portion and by the second portion of the first movable element is sealed;
    the first portion and the second portion of the phasing member disposed on either side of the second movable element;
    the space is sealed on the one hand by a first sealing means (46) disposed between the first portion of the first movable element and the first portion of the phasing member, and on the other hand by a second sealing means (47) disposed between the second portion of the phasing member and the second portion of the first movable element.

2. The device according to claim 1, further comprising a pendulum damper (48) comprising a pendulum support member (49) rotatable around the rotation axis, wherein at least one flyweight (54, 55) is movably mounted on the pendulum support member (49), and wherein the pendulum support member is non-rotatably connected to the phasing member.

3. The device according to claim 2, wherein the first movable element includes a first portion (13) and a second portion (14), wherein the first portion of the first movable element and the second portion of the first movable element being connected to one another so as to delimit a space (45) inside which the second movable element and the phasing member are received.

4. The device according to claim 1, further comprising a pendulum damper (48) comprising a pendulum support member (49) rotatable around the rotation axis, wherein at least one flyweight (54, 55) is movably mounted on the pendulum support member (49), wherein the pendulum support member is non-rotatably connected to the phasing member, and wherein the first portion of the phasing member, the second portion of the phasing member and the pendulum support member are non-moveably connected together by the connecting member (52).

5. The device according to claim 1, wherein the first sealing means and the second sealing means are situated axially on either side of the connecting member.

6. The device according to claim 1, wherein the first sealing means and the second sealing means are situated inside the space delimited by the first portion of the first movable element and by the second portion of the first movable element.

7. A torque transmission assemblage comprising:
    an inertial wheel (6) intended to be rotationally coupled to a crankshaft and rotationally coupled to a reaction plate (8),
    a pressure plate (11),
    a friction disk (12) configured to temporarily non-rotatably couple the reaction plate to the pressure plate, and
    a damping device according to claim 1, coupled to the friction disk.

8. A method for assembling a transmission assemblage comprising a damping device according to claim 1, the method comprising the following steps:
    constituting a first subassembly
        by installing the first portion (32) and the second portion (33) of the phasing member on the second movable element (15),
        by inserting the elastic members (25, 26) into windows of the first and second portions and of the second movable element,
        by placing a first portion (13) and a second portion (14) of the first movable element respectively against the first portion and the second portion of the phasing member,
    constituting a second subassembly by assembling a clutch mechanism (9, 96), and
    installing the first subassembly on the second subassembly, between which a reaction plate (8) is inserted.

9. The method according to claim 8, wherein provision is made for
    constituting a third subassembly by assembling a pendulum damper (48),
    inserting the connecting member (52) through a hole (107) constituted through the second portion of the first movable element,
    installing the third subassembly onto the first subassembly and the second subassembly with the aid of the connecting member.

10. The assembly method according to claim 9, wherein provision is made to fill the hole with the aid of a sealing stopper.

11. A hybrid module having a combustion engine, a friction clutch equipped with a torsional damping device according to claim 1, and an electric machine and a gearbox.

* * * * *